Feb. 2, 1932. H. D. TEFFT 1,843,498
STUNNING PEN FOR THE KILLING OF ANIMALS
Filed Nov. 17, 1930 2 Sheets-Sheet 1

Inventor
HENRY D. TEFFT
By J. B. Dickman, Jr.
Attorney

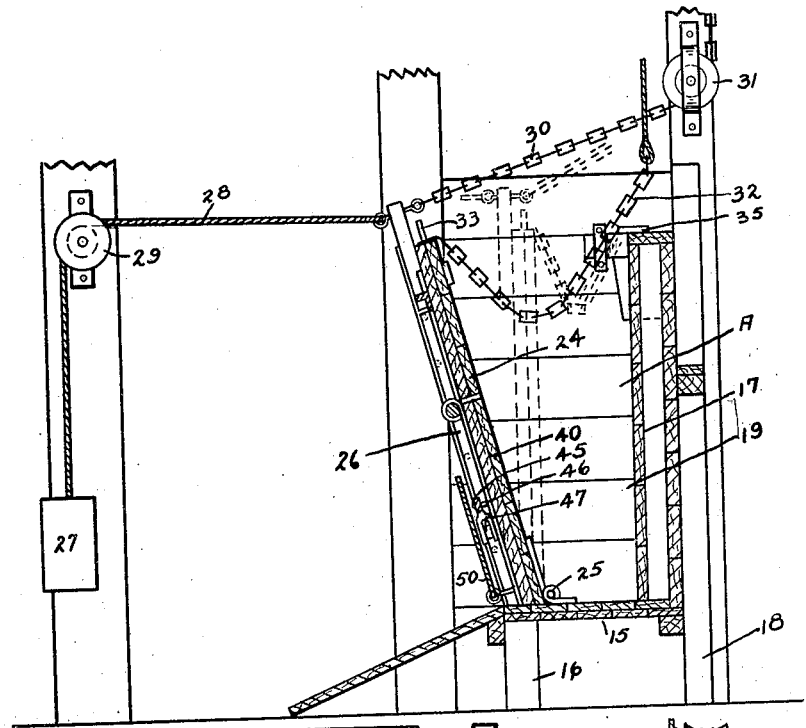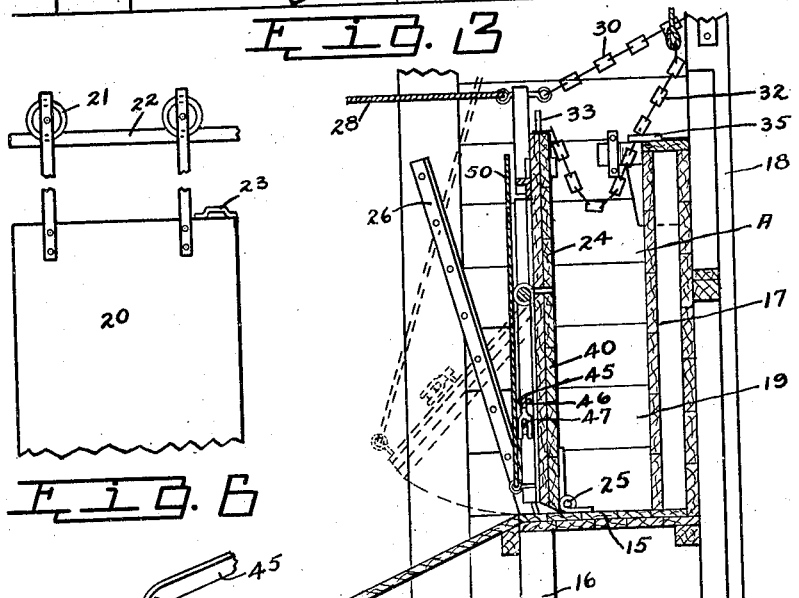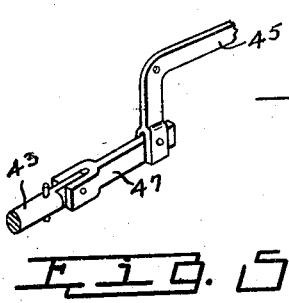

Patented Feb. 2, 1932

1,843,498

UNITED STATES PATENT OFFICE

HENRY DELANO TEFFT, OF CHICAGO, ILLINOIS, ASSIGNOR TO INSTITUTE OF AMERICAN MEAT PACKERS, OF CHICAGO, ILLINOIS, A CORPORATION OF ILLINOIS

STUNNING PEN FOR THE KILLING OF ANIMALS

Application filed November 17, 1930. Serial No. 496,359.

This invention appertains to abattoirs, and more particularly to stunning pens for the killing of animals.

One of the primary objects of my invention is to provide a novel stunning pen having an effective and simple means for holding the animal under restraint in the pen and the head in an elevated position during the stunning process.

Another salient object of my invention is the provision of an animal stunning pen having a single moving gate for both holding the animal against movement during the stunning process, and for permitting the release of the animal to be suspended from the sticking rail.

A further important object of my invention is the provision of novel means for forming the stunning pen, whereby the animal can be readily shackled while held in an upright position in the pen, thereby facilitating the removal of the stunned animal from the pen to the sticking rail.

A further important object of my invention is to provide a stunning pen in which the animal will be under complete control after the same has once entered the pen and held against movement during the stunning process so as to prevent injury of the animal to itself.

A further object of my invention is the provision of a stunning pen embodying a swinging side wall, with means for holding the wall tightly against the animal to prevent movement of the animal, with a hinged gate carried thereby to permit automatic removal of the animal from the pen after the stunning process.

A still further object of my invention is to provide an improved stunning pen for abattoirs, which will be of an exceptionally simple and durable character, one that will be simple and easy to manufacture, and one which can be readily incorporated with existing abattoirs.

With these and other objects in view, the invention consists in the novel construction, arrangement and formation of parts, as will be hereinafter more specifically described, claimed, and illustrated in the accompanying drawings, in which drawings:—

Figure 3 is a transverse section through the improved stunning pen taken on line 3—3 of Figure 2, looking in the direction of the arrows.

Figure 4 is a transverse sectional view through the pen taken on line 3—3 of Figure 2, illustrating the swinging side wall or door in its closed clamping position for engaging the animal.

Figure 5 is a detail fragmentary perspective view illustrating one of the locking bolts and actuating levers therefor for normally holding the swinging gate of the hinged side wall or door in its closed position.

Figure 6 is a detail side elevation of the sliding door for closing one end of the pen.

Referring to the drawings in detail, wherein similar reference characters designate corresponding parts throughout the several views, the letter A generally indicates my improved stunning pen, which is arranged at one end of the usual aisle or walk for the animals being led to the said pen.

Figure 1:
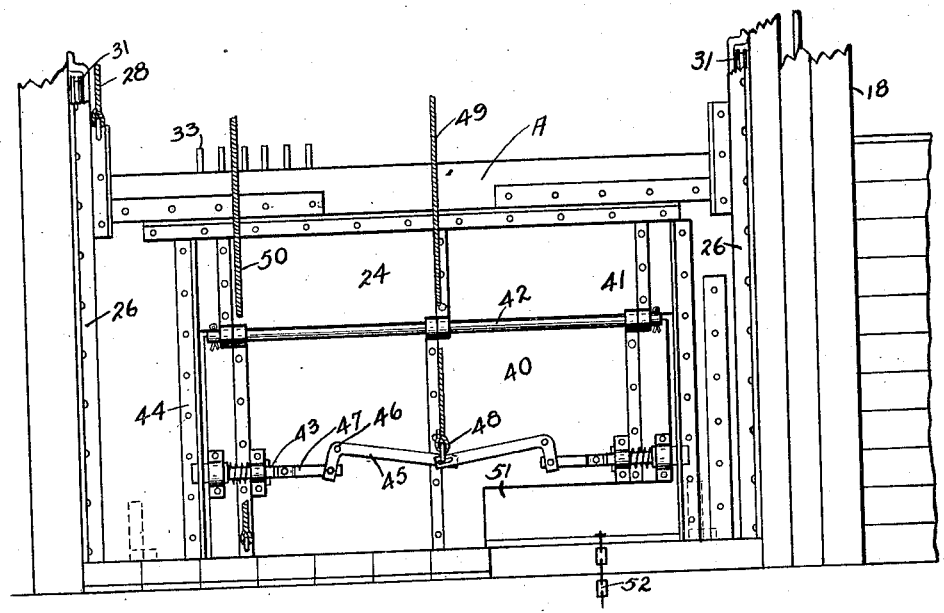
Figure 1 is a side elevation of my improved stunning pen.
Figure 2:
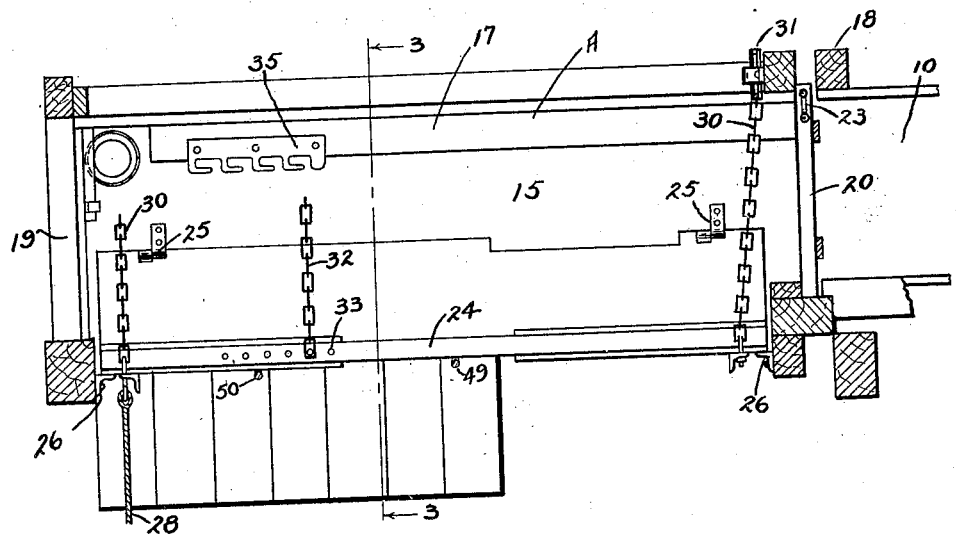
Figure 2 is a top plan view of my improved stunning pen, the supporting uprights or standards being shown in horizontal section.

My improved stunning pen A, comprises a rigid bottom wall or floor 15 which can be constructed in any preferred way, and supported in any preferred manner, such as by stringers or the like 16. I would have it distinctly understood that the bottom wall or floor 15 may be movable and so constructed as to extend into the aisle leading into the pen, the purpose being to move the leading animals into the pen more expeditiously, than if they were walked into the pen.

Rising from one edge of the bottom wall or floor 15, is a rigid side wall 17, which can be supported in any preferred way, such as by uprights or standards 18, which may form a part of the construction of the abattoir. This side wall 17 can also be formed in any preferred manner and in any desired way. At one end of the pen is arranged a rigid end wall 19, which can be formed in any preferred manner and which can be secured to the uprights or standards 18, as shown. From the description so far, it can be seen that the pen comprises a rigid bottom wall or floor 15, a rigid side wall 17, and a rigid end wall 19. The pen, as stated, is arranged at one end of the aisle 10 and an animal is driven directly from the aisle into the pen, after which the animal is separated from the other animals in the aisle by means of a transversely arranged sliding gate or door 20, which forms the other end wall of the stunning pen A. This sliding end wall or gate 20 can be suspended by means of rollers 21 from a suitable overhead track 22, said track 22 being slightly inclined to allow the gate to close of its own accord after the animal has entered the stunning pen. This gate or end wall 20 can also be provided with a handle 23 to facilitate the manipulation thereof. The gate may also be provided with a cable to one end of which a weight (not shown) is attached to assist in automatically closing the door. At this point I would have it understood, the door 20 may be mechanically operated as well as manually and automatically In accordance with my invention, I provide a swinging side wall or door 24, and this door or side wall is arranged on horizontal pivots at its lower edge to permit free swinging movement thereof. As shown, I provide hinges 25 for connecting the lower edge of the movable end wall or door 24, with the bottom wall or floor 15. This swinging end wall or door 24 is adapted to be moved from an inclined position to a vertical clamping position toward the rigid wall 17. In order to limit the outward swinging movement of the hinged wall or door 24, I provide angle irons 26, which are rigidly connected in position in any preferred manner, such as to suitable uprights. As shown, the angle bars 26, are arranged at an angle to the vertical supports, and support the door in its opened angular position as clearly shown in Figure 3 of the drawings. I normally hold this door in its opened position so that the same will be normally out of the way of the animal entering the pen and any desired means can be provided for holding this swinging side wall or door 24 in its opened, inclined position, such as by the use of weight 27 connected to one end of the rope or cable 28, the other end of the rope or cable being secured to the top corner of the said swinging side wall or door 24, as shown in the drawings. This rope or cable can be trained over a suitable guide pulley 29.

I also provide means for forcibly moving, and for rigidly holding the swinging side wall or door 24, in its clamping vertical position, as shown in Figure 4, of the drawings. Any desired means can be utilized for this purpose, but as shown, I provide side chains 30, which are trained over guide pulleys 31. These chains can be wound about a windlass or the like for permitting the operation thereof.

It is obvious that after an animal is driven into the pen and the pen is closed by the sliding door or end wall 20, that the animal can neither move backward or forward, and that upon the moving of the swinging side wall or gate 24 toward the rigid side wall 17, that the animal will be firmly clamped between the two side walls against any movement, thereby preventing injury to the animal and permitting the effective handling of the animal.

I also provide means for engaging the animal's head for holding the same in a raised elevated position while the animal is receiving the stunning blow, so as to facilitate this process. As shown, I provide a neck chain 32, one end of which may be placed over any one of a series of upright pegs 33 carried by the upper edge of the swinging side wall or door 24. The chain can then be passed under any one of a series of hooks 35 carried by the rigid side wall 17 and the free end of the chain can be pulled upwardly after the chain has been passed under the neck of the animal for raising the animal's head to the desired height, and the chain then fastened in any one of the hooks 35.

The swinging side wall or door 24 is formed in a novel manner so as to facilitate the removal of the animal from the pen to the sticking rail, and this hinged side wall or door is provided with an enlarged opening, of a size corresponding to or greater than the size of the animal. This opening is closed by a swinging gate 40, which is connected by means of bearings 41, to the longitudinally extending hinge rod 42. This swinging gate 40, is normally held in a closed position in the plane of the swinging side wall or door 24, by means of spring pressed sliding latch bolts 43, carried by the said gate 40. These spring pressed bolts 43 are adapted to engage in keeper openings formed in angle irons 44, secured to the side wall or door 24.

I provide means for releasing these bolts when it is desired to raise the gate 40 to permit the removal of the animal from the pen. This operating means comprises bell crank shaped operating levers 45, which are pivotally mounted at their angles on suitable pivot pins 46, carried by the gate 40. The outer ends of the short arms of the bell crank are connected by means of a pivoted link 47, with the bolts and the outer ends of the long arms of the bell crank are connected to a loop 48 carried by the lower end of a tripping cable 49, which can be actuated in any preferred way. A rope or cable 50, is provided, one end of which is secured to an I bolt in one corner of the door 40, the rope or cable is then trained over a suitable pulley, the free end being in close reach of the stunning operator. This rope or cable 50 serves a two fold purpose, in that it may be used for agitating the door in order to lock same, or it may be used as a hoisting means for the door 40. Thus it can be seen that the stunning operator is saved the time and trouble of climbing down from the stunning platform in order to lock the door 40.

It is to be noted that one lower corner of gate 40 is provided with a cut out portion 51, which provides means for permitting the shackle chain 52 to be placed around the hind legs of the animal before or during the stunning process. This can be accomplished, due to the fact that the animal is firmly clamped in the pen against movement. This simplifies the shackling of the animal, and it is quite a step forward in the art, over the old method, wherein the animal is dumped out on the floor of the abattoir and then shackled and raised to the sticking rail.

In the use of my improved stunning pen, the leading animal in the aisle 10 is driven or moved into the pen and the door or gate 20 moved to its closed position, after which the hinged wall or door 24 is moved into tightened clamping engagement with the animal, thus holding the animal impinged between the wall 17 and the wall 24. The shackle chain 52 is now placed around the animal's rear legs, through the cut out portion 51, the animal's legs caught. A hoisting cable or rope is connected to the shackle chain and drawn taut by the cable or rope. The animal's head is now raised by the chain 32, and the animal stunned, either by striking the animal on the head with a hammer or by application of an electrical stunner, or by any other suitable means.

After the animal has been stunned the hinged door or wall 24 is released and at the same time the cable or rope 49 is raised, which withdraws the latch bolts 43 from the keeper openings. As the door or wall 24 swings away from the rigid wall 17, the door 40 opens, due to the angular position that the wall or door 24 assumes, and also due to the weight of the animal's weight against said door as its body slumps to the floor 15 of the pen. The cable attached to the shackle chain 52 being taut, the animal is lifted outwardly directly into the sticking rail.

From the foregoing description, it can be seen that I have provided a novel stunning pen for abattoirs in which the animals can be quickly and readily handled in a sanitary manner.

Changes in details may be made without departing from the spirit or scope of my invention, but:—

What I claim is:

1. A stunning pen for abattoirs, a rigid bottom wall, a rigid side wall, a rigid end wall, a movable gate for separating the pen from the delivery aisle of the abattoir, a hinged side wall carried by the bottom wall and movable toward and away from the rigid wall, means normally holding the hinged side wall away from the rigid side wall, means for limiting the outward swinging movement of said hinged side wall, and means for moving the hinged side wall toward the rigid wall.

2. In a stunning pen for abattoirs, a rigid side wall, a hinged side wall movable toward and away from the rigid side wall for clamping an animal therebetween, a swinging delivery gate carried by the hinged side wall, means normally holding the gate against swinging movement, and means for releasing the holding means, the swinging gate automatically opening for animal delivery.

3. In a stunning pen for abattoirs, a rigid side wall, a hinged side wall movable toward and away from the rigid side wall for clamping an animal therebetween, a swinging delivery gate carried by the hinged side wall, means normally holding the gate against swinging movement, means for releasing the holding means, the swinging gate automatically opening for animal delivery, said gate having one lower corner cut away to provide a shackle receiving chain, and an inclined platform leading from the bottom wall under said gate.

4. In an animal stunning pen for abattoirs, a rigid side wall, a hinged side wall movable toward and away from the rigid side wall for clamping an animal therebetween, means for holding an animal's head in a raised position, said means embodying a neck chain, a plurality of pins carried by the hinged side wall, a plurality of hooks carried by the rigid side wall, one end of the chain being adapted to selectively fit over any one of the pins, and an intermediate portion of the chain to be selectively received under any one of said hooks and fastened.

In testimony whereof, I affix my signature.

HENRY DELANO TEFFT.